United States Patent [19]

Kupcikevicius et al.

[11] Patent Number: 4,608,730
[45] Date of Patent: Sep. 2, 1986

[54] DISPOSABLE TENSION SLEEVE FOR A STUFFING MACHINE

[75] Inventors: Vytautas Kupcikevicius; Vytas A. Raudys, both of Chicago, Ill.

[73] Assignee: Viskase Corporation, Chicago, Ill.

[21] Appl. No.: 751,891

[22] Filed: Jul. 5, 1985

[51] Int. Cl.$^4$ ............................................. A22C 11/00
[52] U.S. Cl. ........................................... 17/41; 17/49
[58] Field of Search ............... 17/41, 42, 49, 1 F, 17/35

[56] References Cited

U.S. PATENT DOCUMENTS

| Re. 30,265 | 5/1980 | Kupcikevicius et al. | 17/41 |
|---|---|---|---|
| Re. 30,390 | 9/1980 | Kupcikevicius et al. | 17/49 |
| 3,873,744 | 3/1975 | Townsend et al. | 426/284 |
| 3,949,446 | 4/1976 | Smith | 17/41 |
| 4,034,441 | 7/1977 | Kupcikevicius | 17/41 |
| 4,164,057 | 8/1979 | Frey et al. | 17/35 X |
| 4,202,075 | 5/1980 | Michel et al. | 17/41 |

FOREIGN PATENT DOCUMENTS 2100571 12/1984 United Kingdom .

*Primary Examiner*—Willie G. Abercrombie
*Attorney, Agent, or Firm*—Roger Aceto

[57] ABSTRACT

A tension sleeve for a stuffing machine on which is predisposed a casing supply prior to connection of the tension sleeve to the stuffing machine. A sizing means is attached to the tension sleeve by a nosepiece. The nosepiece has a collar extending into a nesting relationship with the tension sleeve. A stop on the nosepiece limits the nesting relationship and also positions and locates the sizing means on the nosepiece. A one-way lock on the collar and aft of the stop attaches to the tension sleeve and a second one-way lock forward of the stop attaches to the sizing means.

19 Claims, 3 Drawing Figures

DISPOSABLE TENSION SLEEVE FOR A STUFFING MACHINE

BACKGROUND OF THE INVENTION

The present invention relates to a tension sleeve for a stuffing machine including a supply of shirred casing predisposed on the sleeve. More particularly the invention relates to an adaptor means for the tension sleeve which facilitates the rigid attachment of a sizing disc to the tension sleeve after the casing is put onto the tension sleeve.

One type of stuffing apparatus for food emulsions well known in the art utilizes a reciprocally operable tension sleeve to provide the slack casing required when gathering and closing the casing about the stuffed article. This type of apparatus is exemplified in U.S. Re. Pat. No. 30,390. As disclosed in the '390 Patent, the tension sleeve is a permanent machine component disposed coaxially about the stuffing horn of the machine. The aft end of the tension sleeve is fixed to a slacker mechanism which slides the tension sleeve forward and backward along the stuffing horn at appropriate times in the stuffing cycle. This reciprocating movement provides the slack casing required for gathering and closing.

In the operation of such a stuffing machine, a shirred casing stick is slipped over the tension sleeve and then a sizing disc is detachably secured to the sleeve for mounting the casing on the tension sleeve. The inside diameter of the shirred casing stick is larger than the outside diameter of the tension sleeve to provide the clearance space required for sliding the casing onto the sleeve. When the casing supply is exhausted, the sizing disc is detached from the tension sleeve and a fresh supply of casing is placed over the tension sleeve and is mounted in position on the tension sleeve by reattachment of the sizing disc.

Certain advantages can be obtained by eliminating the clearance between the shirred casing and the tension sleeve. For example, the clearance takes up space which otherwise can be used to accommodate casing. By eliminating this space and having the casing fit tightly about the sleeve the space otherwise utilized for clearance is now utilized to accommodate casing. This provides the casing stick with an enhanced ratio of casing length to shirred casing length (pack ratio) so that the customer has a greater overall length of casing without substantially changing the length of the shirred casing stick. However, when the clearance is eliminated by having the casing gripped tightly about the sleeve, it is difficult or even impossible for the user to slip casing onto the tension sleeve. Accordingly, as is known from United Kingdom Pat. No. 2100571, incorporated herein by reference, the tension sleeve can be removed as a permanent machine component and, instead, it can be provided as a component of the casing article which is adapted to be attached to the stuffing machine.

The casing article as shown in the '571 United Kingdom Patent comprises a tension sleeve core, a supply of shirred casing on the core in the form of a highly compacted shirred casing stick which frictionally engages about and presses inward on the core, and a sizing means attached to the fore end of the core for purposes of stretching the casing as the casing deshirrs and is drawn over and about the sizing means during stuffing. The casing can be disposed on the tension sleeve core in any one of several ways in order to have the stick frictionally engaged about the core. For example, the casing can be shirred and/or compacted directly on the core. Another way is to shirr and/or compact the casing on a mandrel and then longitudinally transfer the compacted casing stick onto a core, of slightly smaller outside diameter than the mandrel, butted against an end of the mandrel. After compaction and transfer, the casing and pleats of the shirred stick will expand inward, as is known in the art, to frictionally engage about the tension sleeve core.

The aft end of the tension sleeve core has a flange or other structure to facilitate attachment of the tension sleeve core to the reciprocally operable slacker mechanism of the stuffing machine. Preferably the casing stick is disposed onto the tension sleeve core over its fore end and towards this flange. This requires that the sizing disc be attachable to the core after the casing had been disposed on the core. In the present invention, this attachment is facilitated by providing the tension sleeve component of the casing article with means to rigidly attach the sizing disc to the tension sleeve after casing has been disposed on the sleeve. As further described herein, the means preferably is a connector in the form of a tubular nosepiece which is physically attached to the fore end of the tension sleeve via a one-way locking arrangement, the nosepiece including means for receiving, positioning, and fixing a sizing means onto the nosepiece via another one-way locking arrangement.

SUMMARY OF THE INVENTION

The present invention may be characterized by a stuffing machine tension sleeve slidably disposable over a stuffing horn and attachable to the slacker of the machine comprising:

a. an elongated tubular member having fore and aft ends and an inside bore diameter sufficient for slidably positioning said tubular member over a stuffing horn of a stuffing machine;

b. attachment means at said aft end and co-actable with a part on the stuffing machine for releasably attaching said tubular member to a reciprocally operable slacker of the machine;

c. a tubular nosepiece at said fore end having a rearward portion disposed in nesting relationship with said tubular member, and cooperating lock means on said rearward portion and tubular member for locking said nosepiece to said tubular member in said nesting relationship;

d. stop means on said nosepiece forward of said rearward portion and abutting said fore end to establish a limit to said nesting relationship;

e. connector means on said nosepiece forward of said stop means;

f. an annular sizing means fixed on said nosepiece including connector elements at an inner periphery thereof in fixed connective mating engagement with said connector means and said annular sizing means having a wall extending radially from said connector elements to an outer periphery which defines a casing contacting portion; and g. said stop means further providing positioning means co-acting which said sizing means for longitudinally locating said annular sizing means with respect to said nosepiece.

In another aspect, the invention is a tubular nosepiece for connection to the fore end of a stuffing apparatus tension sleeve comprising:

a. a collar for nesting relationship and locking engagement with said tension sleeve;

b. a stop forward of said collar for abutting the fore end of said tension sleeve and for establishing thereby a limit to said nesting relationship; and c. connector means on said nosepiece forward of said stop for coacting locking engagement with a sizing means forced onto said nosepiece and against said stop.

DESCRIPTION OF THE PREFERRED EMBODIMENT

Figure 1:
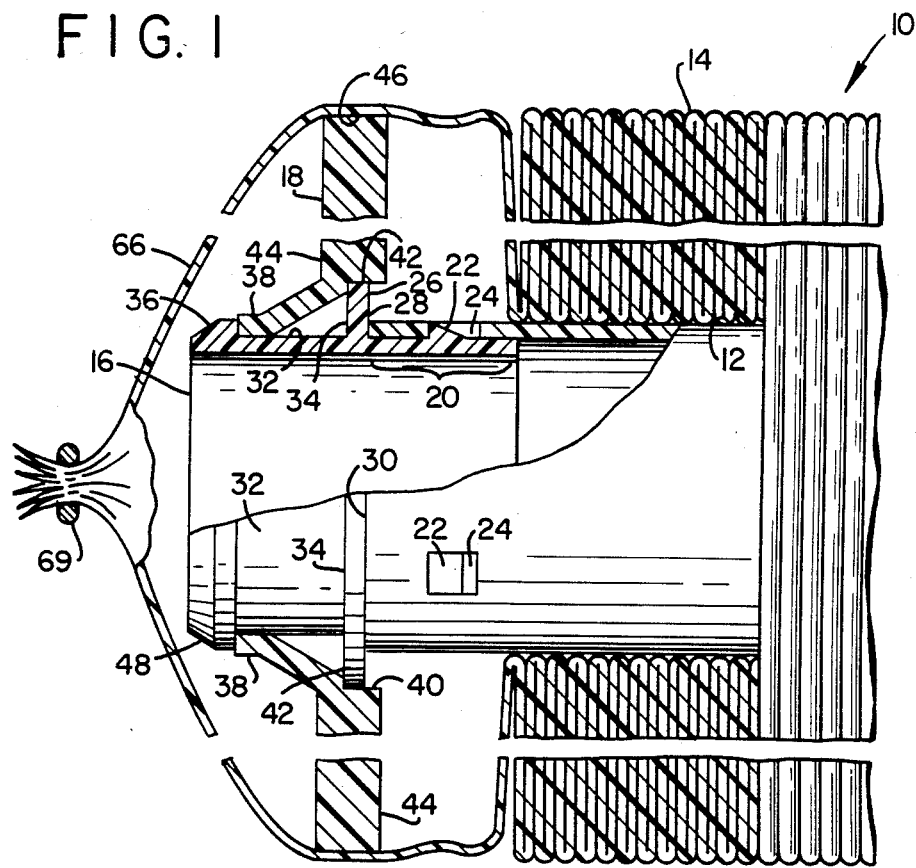
FIG. 1 is a side elevation view party broken away and in section showing the fore end of a casing article incorporating the tension sleeve core and sizing disc connector means of the present invention.

Referring to the drawings, FIG. 1 shows a portion of a casing article 10 including the forward portion of a tension sleeve core 12, shirred casing 14 gripped about the core, a connector in the form of a tubular nosepiece 16 attached to the tension sleeve core and a sizing disc 18 carried by the nosepiece. The sizing disc shown, incorporating resilient finger connecting elements, is fully disclosed in U.S. Re. Pat. No. 30,265.

The aft portion of nosepiece 16 comprises a collar 20 designed to enter into a nesting relationship with the forward portion of the tension sleeve core as shown.

The collar can extend about the outside of the tension sleeve core, but it is preferred to have it extended into the bore of the tension sleeve core as shown. This will enable at least part of the nosepiece to function as a sliding bearing means for supporting the tension sleeve core on a stuffing horn as set out hereinbelow. The construction as shown also aids in maintaining the connection of the nosepiece and tension sleeve core when employing the one-way locking means as described further hereinbelow.

Collar 20 carries lock elements for purposes of attaching the nosepiece to the tension sleeve. While any appropriate bayonet or other twist type or screw type locking elements may be used, the preferred elements as shown in FIG. 1 are in the form of wedge shaped elements 22 disposed at equally spaced intervals about the sleeve. Three such elements are used but only two of the elements are shown in FIG. 1. Elements 22, being wedge shaped, provide a means for fixedly attaching nosepiece 16 to the tension sleeve core in that once the elements 22 are registered with corresponding windows 24 in the tension sleeve core, the nosepiece is not readily detachable.

Located on the nosepiece collar 20 is a stop 26. The stop is in the form of a rib which extends about the nosepiece so that an upstanding surface of the stop, identified as its reverse surface 28, is butted against the fore end 30 of the tension sleeve core. This abuttment between stop 26 and fore end 30 provides the means to limit the nesting relationship between the nosepiece 16 and the tension sleeve core 12.

Also on nosepiece 16 and forward of stop 26 is a channel 32 which extends about the nosepiece. As shown in FIG. 1, channel 32 may be defined between the forward or obverse surface 34 of the stop and a lip 36 which also extends about the nosepiece. Channel 32 forms a connector means for engaging with connector elements on sizing disc 18. In this respect, the connecting elements of the sizing disc are resilient fingers 38 disposed at spaced intervals about an inner periphery 40 of the sizing disc. The fingers flex outwardly when the disc is pushed coaxially onto the nosepiece over lip 36 and then subsequently snap into the channel 32 to longitudinally fix the disc with respect to the nosepiece.

Since fingers 38 are flexible, the sizing disc 18 is capable of limited radial movement in a plane generally perpendicular to the longitudinal axis of the tension sleeve core. To prevent such movement, stop 26 includes a surface 42 which butts against the sizing disc inner periphery 40. This surface 42 of stop 26 provides a rigid seat to receive a nonresilient part of the sizing disc 18 (i.e., its inner peripherial surface 40) and thereby prevent radial movement of the disc. Accordingly, the stop as shown in FIG. 1 functions as a positioning means for locating the sizing disc both longitudinally and coaxially with respect to the nosepiece and it also functions to limit the nesting relationship of the nosepiece and the tension sleeve core.

Extending radially from the flexible fingers 38 and inner periphery 40 is a rigid wall 44 which has an outer annular periphery 46 defining a casing contacting portion. The wall 44 as shown in FIG. 1 is substantially normal to the longitudinal axis of the tension sleeve, but it can be inclined with respect to the longitudinal axis of the tension sleeve so as to define a conical sizing means. Thus a conical sizing means would be considered "radially extending" for purposes of the present invention.

To complete the structure of nosepiece 16 as shown in FIG. 1, there is an inclined cam surface 48 on lip 36 to facilitate the outward flexing of the flexible fingers 38 as the sizing disc is pushed onto the nosepiece.

Figure 2:
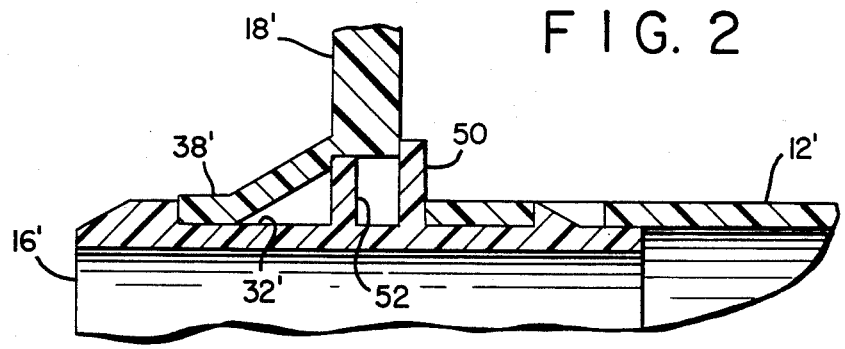
FIG. 2 is a sectional view showing, on an enlarged scale, a portion of another embodiment of the sizing disc connector means attached to the fore end of the tension sleeve.

A modified version of the nosepiece, as shown in FIG. 2, has two ribs 50 and 52. These ribs perform the same functions of the stop 26 shown in FIG. 1. For example, the rearward rib 50 acts to limit the nesting relationship between the nosepiece 16' and the tubular sleeve core 12'. The second or forward rib 52 defines a surface of a channel 32' for receiving the resilient locking elements 38' on the sizing disc 18'. One or the other, or both, of the ribs 50 and 52 can function to position the sizing disc both coaxially and longitudinally of the nosepiece. Thus in the FIG. 2 embodiment, the functions performed by two structural elements (ribs 50 and 52) are the same as performed by the single structural element (stop 26) of the FIG. 1 embodiment.

To assemble the casing article 10 of FIG. 1, the casing supply 14 first is disposed onto the tension sleeve core 12 over the fore end 30. Nosepiece 16 is then pushed into the tension sleeve core until the locking elements 22 register with and snap into windows 24. The wedge shape of the locking elements provides a one-way locking means in that once the locking elements 22 are snapped into position, pulling on the nosepiece will not release the locking relationship between the nosepiece and tension sleeve core. Also, when the locking elements 22 are seated in the windows 24, stop 26 is against the tension sleeve fore end 30. This prevents pushing the nosepiece deeper into the tension sleeve so that the locking elements 22 are maintained snapped into the windows 24. Thus the stop and locking elements work together to prevent the removal of the nosepiece from the tension sleeve.

The sizing disc 18 then is pushed onto the nosepiece to snap connect the flexible fingers 38 into channel 32 and against stop 26. While any bayonet or other twist type or screw type connection can be used to connect the sizing disc to the nosepiece, it is preferred that the connection be fixed and not detachable since the tension sleeve is intended to be a single use item. Where moldable polymeric materials are used, it would be possible to manufacture the disc and nosepiece as an integral unit for attachment to the tension sleeve core.

After the disc is mounted, an unshirred portion 66 of the casing is drawn forward over the sizing disc and preferably closed by a clip 69 in a conventional manner. This produces a tension sleeve (preferably a disposable tension sleeve) including a casing supply predisposed on the tension sleeve, ready for mounting to the stuffing apparatus.

Figure 3:
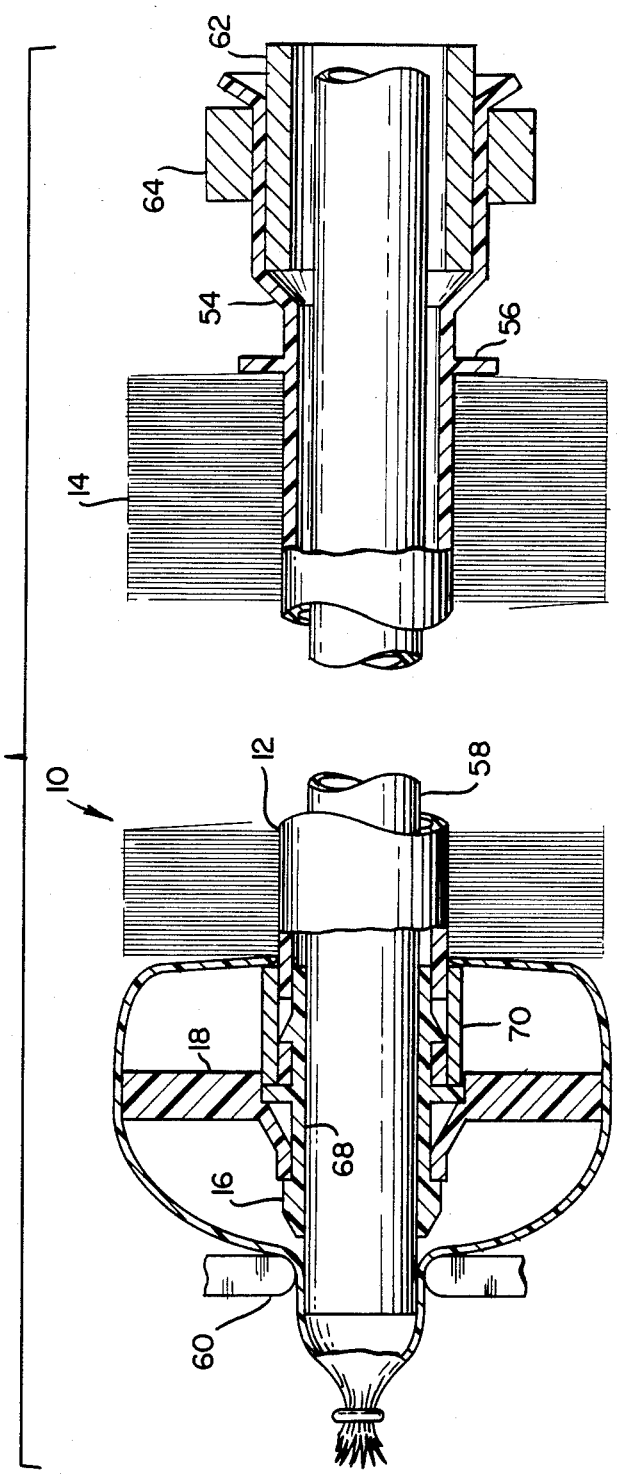
FIG. 3 is a view partly broken away and in section showing the casing article including the sizing disc connector means in position about the stuffing horn of a stuffing machine.

The casing article 10, mounted to a stuffing machine and ready for stuffing to begin, is shown in FIG. 3. Attachment of the casing article to the stuffing machine is via a flange 54 at the aft end of the tension sleeve core. A shoulder 56 on the core is spaced forward of flange 54 to insure that the casing supply is kept away from the flange so as not to interfere with the attachment of the flange to the stuffing machine. Note that it also may be necessary to keep the shirred casing supply 14 away from sizing disc 18 so as not to interfere with the deshirring of the casing over the sizing disc. For this purpose a split sleeve 70 (see FIG. 3), during assembly of the casing article, can be placed about the fore end portion of the tension sleeve 12 between the sizing disc and the shirred casing supply. This split sleeve will prevent the shirred casing supply 14 from expanding or otherwise moving forward and jamming against the sizing disc.

The stuffing machine is substantially conventional in design and is generally of a type described in U.S. Re. Pat. No. 30390. The conventional parts of such a stuffing machine include a stuffing horn 58 and an emulsion sealing ring 60. The machine also includes a reciprocially operable slacker modified to releasably attach to casing article 10. This modified slacker includes a hub, a portion of which is schematically shown at 62 for receiving the attachment means (flange 54) at the aft end of the tension sleeve core 12. A quick release clamp shown schematically at 64 is used to attach flange 54 to hub 62.

In operation the emulsion sealing ring 60 is moved away from the stuffing horn 58 so that the casing article 10 can be slipped over the stuffing horn. Flange 54 is positioned over hub 62 and the quick release clamp 64 is closed to lock the flange to the hub as shown in FIG. 3. The emulsion sealing ring is moved back onto the stuffing horn to the position shown in FIG. 3 so that stuffing can begin.

In order to provide slack casing for gathering and closing around the ends of a stuffed casing, the slacker mechanism is operated at appropriate times in the stuffing cycle. The slacker moves the tension sleeve forward and back so that casing is pulled over the sizing disc 18 to provide the slack casing needed for gathering and clipping. This slacking action is more fully described in the aforementioned U.S. Re. Pat. No. 30390.

It should be appreciated that the tension sleeve core 12 is relatively long and it may support a shirred casing stick containing upwards of 300 or more feet of casing. The forward end of such a long tube, weighted by the shirred casing, would sag onto and drag along the stuffing horn during the slacking operation. However, as mentioned hereinabove, at least a part of nosepiece 16, being extended into the tension sleeve, functions as a sliding bearing. This is clearly shown in FIG. 3 wherein the inner surface 68 of the nosepiece 16 concentrically locates tension sleeve core 12 about the stuffing horn and slidably supports the fore end of the tension sleeve core on the horn.

After the casing supply 14 is exhausted, the emulsion seal means 60 is moved away from the stuffing horn and the quick release clamp 64 is opened so the tension sleeve core 12 can be removed and a new casing article 10 put onto the stuffing horn.

Thus it should be appreciated that the present invention provides a tension sleeve component which carries its own casing supply and which is easily mountable to a stuffing machine. The tubular nosepiece component as described herein quickly and easily attaches to the tension sleeve in a positive one-way lock. The nosepiece further provides the means for receiving, positioning and fixing a sizing means to the nosepiece. The simple construction of the components as described herein and ease with which they are assembled lend themselves to manufacture from polymeric materials so they can all be provided as disposable items.

While a preferred embodiment has been described, other modifications can be made without changing the spirit and scope of the invention as claimed. For example the flange 54 and shoulder 56 can be made as a separate part attachable to the tension sleeve. This construction would permit the casing to be disposed on the tension sleeve over its aft end and towards a nosepiece and sizing disc premounted to the tension sleeve core.

Having thus described the invention in detail, what is claimed as new is:

1. A tension sleeve for a stuffing machine of the type having a reciprocally operable slacker mechanism comprising:
 a. an elongated tubular member having fore and aft ends and an inside bore diameter sufficient for slidably positioning said tubular member over a stuffing horn of the stuffing machine;
 b. attachment means at said aft end and co-actable with a part on said stuffing machine for releasably attaching said tubular member to the reciprocally operable slacker mechanism of said stuffing machine;
 c. a tubular nosepiece at said fore end having a rearward portion disposed in nesting relationship with said tubular member and cooperating lock means on said rearward portion and tubular member for locking said nosepiece to said tubular member in said nesting relationship;
 d. stop means on said nosepiece forward of said rearward portion and abutting said fore end to establish a limit to said nesting relationship;
 e. connector means on said nosepiece forward of said stop means;
 f. a sizing means fixed on said nosepiece including connector elements at an inner periphery thereof in fixed connective mating engagement with said connector means and having a wall extending radially from said connector elements to an outer periphery which defines a casing contacting portion; and g. said stop means further providing positioning means co-acting with said sizing means for longitudinally locating said sizing means with respect to said nosepiece.

2. A tension sleeve as in claim 1 including a supply of shirred and longitudinally compacted casing disposed on said tubular member between said attachment means and said sizing means, said supply having the casing pleats thereof expanded inwardly and pressed against said tubular member and gripped tightly thereabout for frictionally retaining said supply of casing on said tubular member.

3. A tension sleeve as in claim 1 wherein said cooperating lock means includes a lock element and a window means for capturing therein said lock element.

4. A tension sleeve as in claim 1 wherein said cooperating lock means includes a one-way lock element on said tubular nosepiece rearward portion which is capturable in a window means opening through said tubular member.

5. A tension sleeve as in claim 3 or 4 wherein said lock element projects outward from said rearward portion for reception into said window means on said tubular member to register said lock element and window means.

6. A tension sleeve as in claim 1 wherein said rearward portion is a collar which extends into said tubular member and said stop is a projection extending radially outward from said collar.

7. A tension sleeve as in any one of claims 1-4 or 6 wherein said stop has an upstanding reverse surface abutting said fore end and an upstanding obverse surface defining one end wall of a channel extending about said nosepiece and said sizing means connector elements are captured in said channel.

8. A tension sleeve as in claim 7 wherein said nosepiece has a cam surface forward of said channel, and said sizing means connector elements include resilient portions which are moved radially outward by said cam surface upon said annular sizing means being urged onto said nosepiece over said cam surface and said resilient portions thereafter springing into said channel thereby becoming locked therein.

9. A tension sleeve as in claim 1, wherein said stop has a rigid surface positioned against an inner peripheral surface of said sizing means for concentrically locating said sizing means about said nosepiece.

10. A tension sleeve as in claim 1 wherein said nosepiece has an inner periphery which is slidably bearable against the stuffing horn for supporting said nosepiece and the tubular member connected thereto concentrically about the stuffing horn.

11. A tension sleeve as in claim 1 wherein said stop comprises:
   a. a first rib about said nosepiece having a reverse surface butted against said fore end; and
   b. a second forwardly spaced rib about said nosepiece having an obverse surface forming a portion of said connector means.

12. A tension sleeve as in claim 2 wherein said shirred casing has an unshirred portion extended over and about said sizing means.

13. A tubular nosepiece for connection to the fore end of a stuffing apparatus tension sleeve comprising:
   a. a collar for nesting relationship and locking engagement with said tension sleeve;
   b. a stop forward of said collar for abutting the fore end of said tension sleeve and for establishing thereby a limit to said nesting relationship; and
   c. connector means on said nosepiece forward of said stop capable of coacting locking engagement with a sizing means when said sizing means is placed onto said nosepiece and against said stop.

14. A tubular nosepiece as in claim 13 including a channel formed in said nosepiece to receive and retain captured therein a sizing means connector means and said channel and stop together providing means to engage and position the sizing means on said nosepiece.

15. A tubular nosepiece as in claim 13 wherein said collar has one-way lock elements thereon adapted to engage and lock to cooperating lock elements on said tension sleeve.

16. A tubular nosepiece as in claim 15 wherein said one-way lock elements on said collar are wedge-shaped to register with and snap into window means on said tension sleeve upon said collar and tension sleeve entering a nesting relationship.

17. A tubular nosepiece as in claim 14 including a cam member about said nosepiece forward of said stop, said cam member and stop each having an upstanding surface which defines the walls of said channel, and the sizing means connector means being snap engaged into said channel upon urging of the sizing means over said cam member.

18. A tubular nosepiece as in claim 13 wherein said stop has an upright surface for abutment against a sizing means urged onto said nosepiece to prevent movement of said sizing means rearward of said stop.

19. A tubular nosepiece as in claim 13 wherein said stop is a rigid annular member having a surface for receiving an inner periphery of a sizing means to concentrically locate said sizing means about said nosepiece.

* * * * *